Dec. 20, 1949  V. E. PRATT ET AL  2,492,005
APPARATUS FOR DUPLEX PHOTOGRAPHY
Filed April 3, 1947  4 Sheets-Sheet 1

INVENTORS.
VERNEUR E. PRATT
GEORGE F. GRAY
BY
Van Deventer & Grier
ATTORNEYS

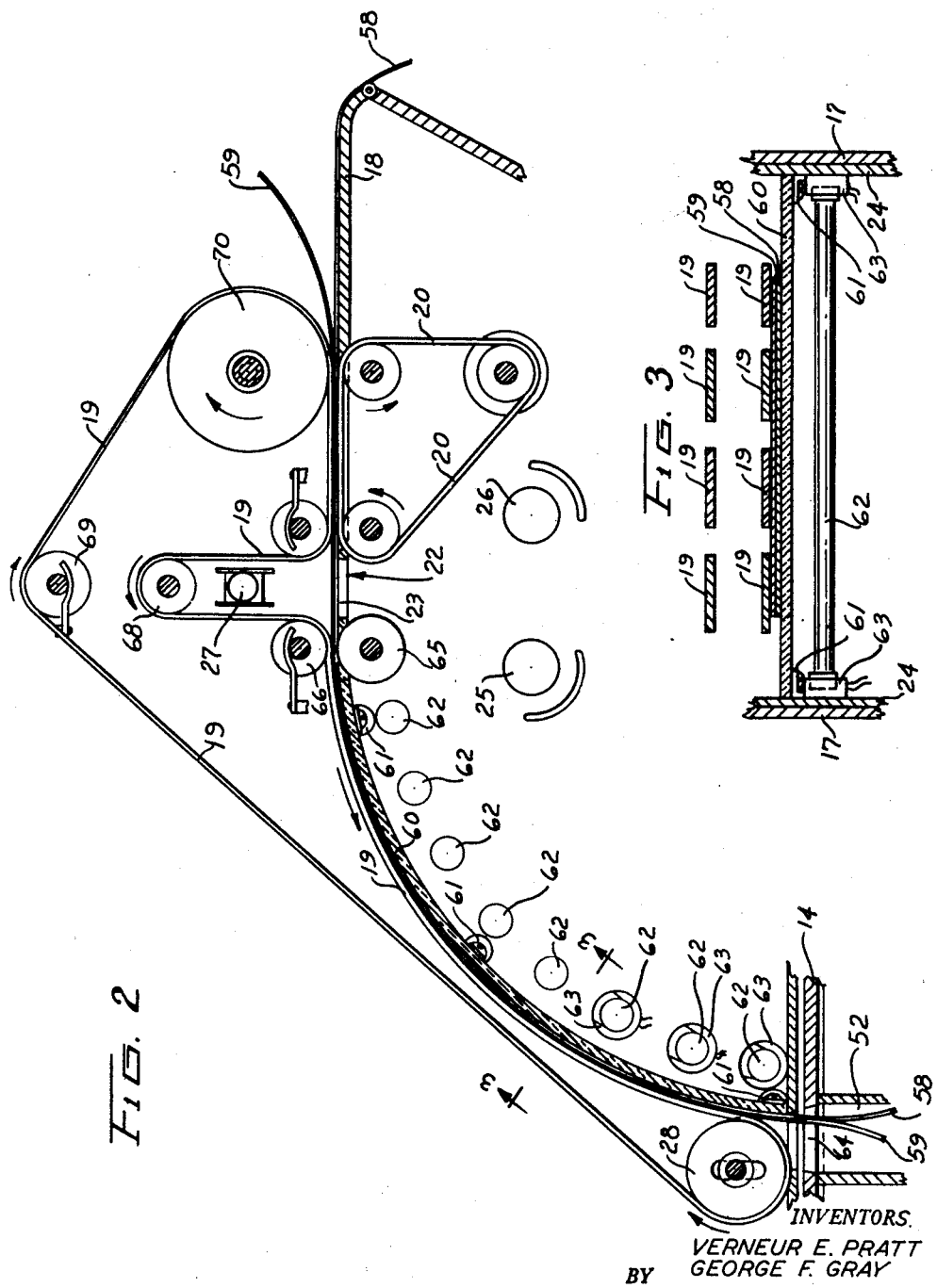

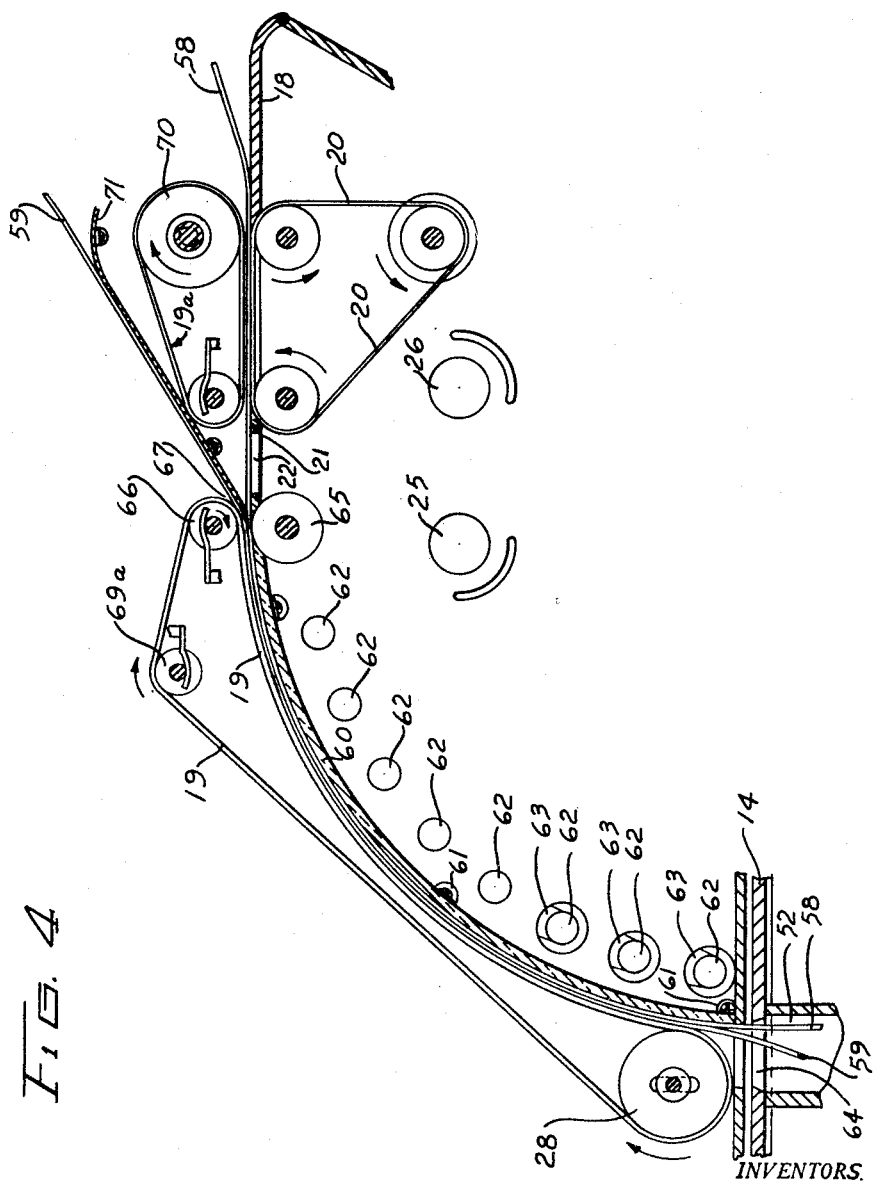

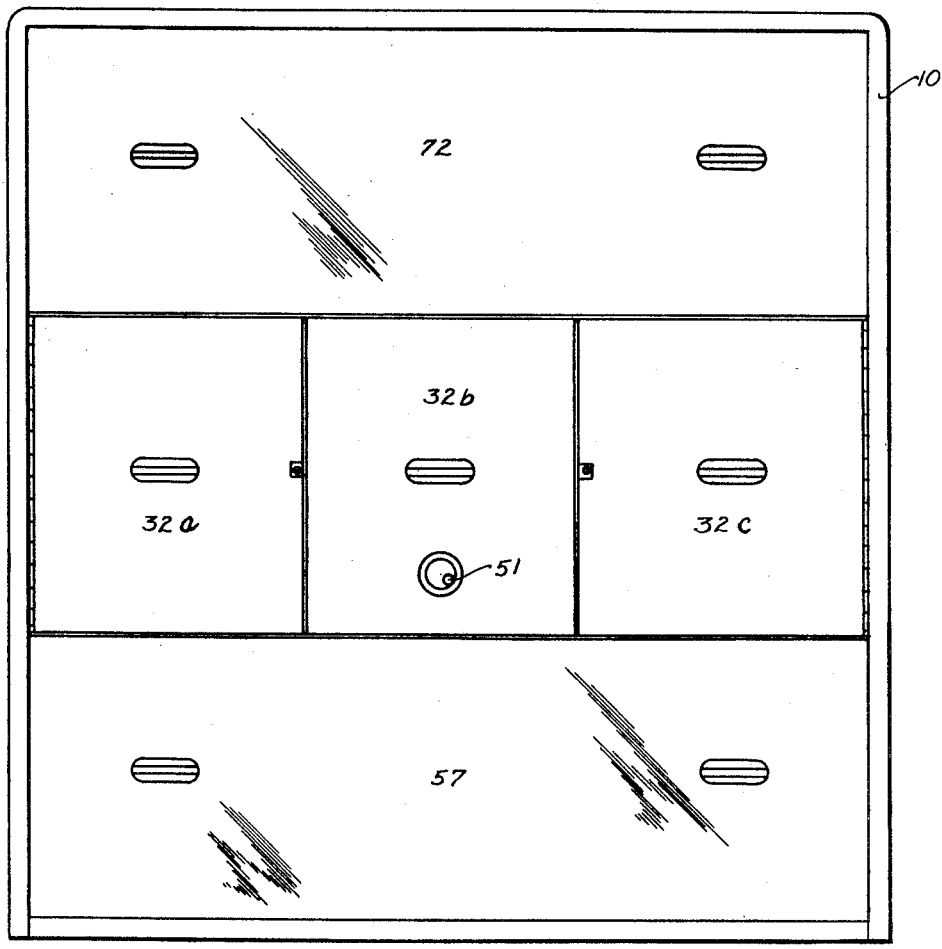

Patented Dec. 20, 1949

2,492,005

UNITED STATES PATENT OFFICE 2,492,005

APPARATUS FOR DUPLEX PHOTOGRAPHY

Verneur E. Pratt and George F. Gray,
Norwalk, Conn.

Application April 3, 1947, Serial No. 739,058

3 Claims. (Cl. 88—24)

This invention relates to an apparatus for duplex photography and is a continuation-in-part of the co-pending application Serial Number 622,198, filed October 13, 1945, entitled Flow cameras.

An object of the invention is to provide an apparatus for photographing copy such as a sheet of drawings or the like as it is flowed across the field of view of a camera lens and at the same time, or after said copy has been moved to a second position, making a full sized contact print of the copy on a sensitized sheet overlying the back of the copy sheet.

Other objects and advantages of the invention will be apparent from the following specification together with the accompanying drawings in which is described and illustrated a preferred form of apparatus for practising the method.

It will be understood however, that many changes can be made in the details of construction herein disclosed, the method and apparatus being defined by the appended claims.

In the accompanying drawings:

Figure 2 is a view partly in section of the printer platen used in the camera Figure 1, for making contact prints;

Figure 3 is a transverse sectional view on the line 3—3 of Figure 2;

Figure 4 is a view partly in section illustrating a modified form of the camera shown in the preceding figures; and Figure 5 is a front view of the camera Figure 1 showing a cabinet about 56 inches square.

Figure 1:
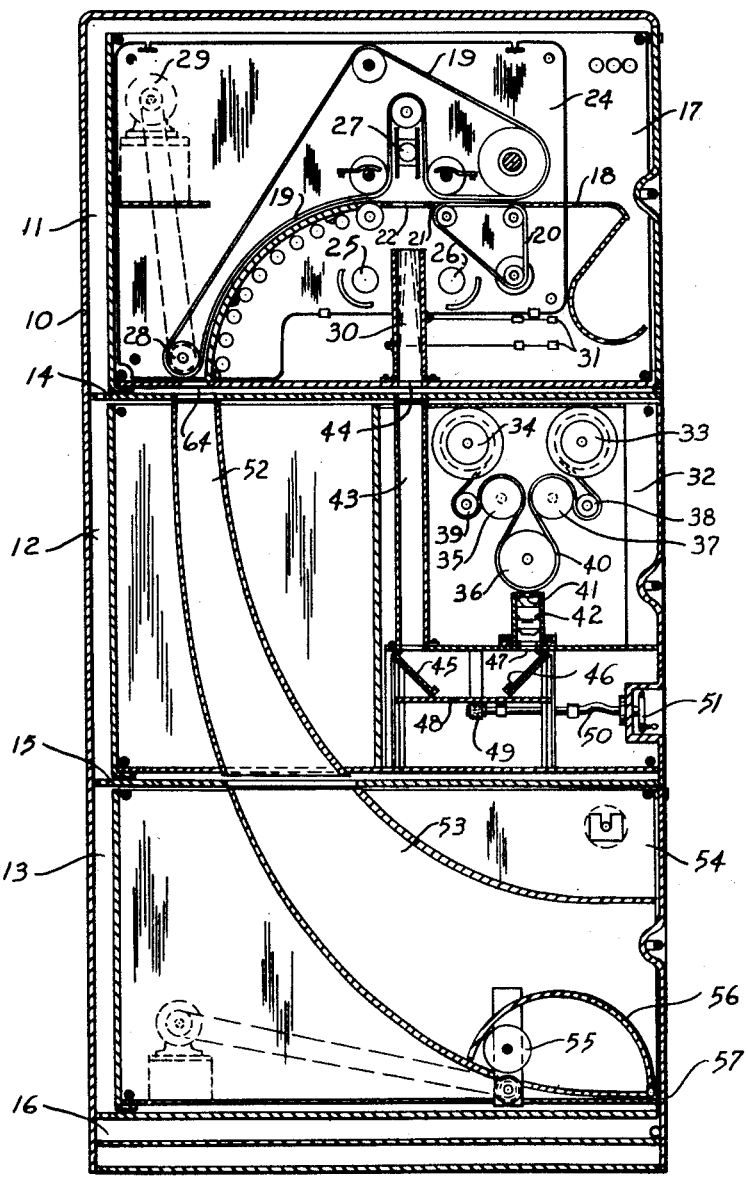
Figure 1 is a vertical sectional view of a complete camera suitable for practising the method herein disclosed.

In the co-pending application before mentioned, is disclosed a flow camera the same as that shown in Figure 1 of the present application but without the transparent arcuate platen shown in Figure 2 hereof.

Said camera will not be herein described in detail, but only sufficient reference will be made to the same to enable the relation of the instant invention thereto to be understood in order to practice the method herein disclosed.

It may be pointed out that flow cameras as herein described are used for making microfilm from documents which are placed on a feeder mechanism which conveys them past a slit and the flowing slit image is impressed by the lens of the camera upon a moving sensitized film therein to produce a reduced image of said documents often termed "copy."

The camera herein described is particularly suited for handling relatively long and wide sheets of copy, such, for example, as tracings 48 inches wide and 30 feet long, and the camera will make microfilms of these tracings and make full-sized contact prints thereof, discharging the copy and the sensitized sheet upon which the contact print is made, whereby the latter may be developed in the usual manner by which blue prints, brown prints and the like are processed.

It will at once be apparent that by this method contact prints such as blue prints can be made of the copy tracing while it is being photographed to make microfilm and in the same camera.

This eliminates the necessity of handling the tracings twice which is otherwise necessary, and eliminates the necessity of providing a separate machine for making contact prints such as the ordinary blue print machine. Thus, a considerable saving in time and expense is effected, the duplex camera herein disclosed being a compact device well suited for office and drafting room use.

Referring now to Figure 1, the numeral 10 denotes a supporting framework or casing constructed in any suitable manner and preferably in the manner commonly employed in the fabrication of steel filing cabinets. The framework forms the outer casing of the device and is not described in detail as the construction of same forms no part of the present invention.

The casing has three compartments 11, 12, 13 having division spaces 14—15 therebetween which may contain the usual rails of the framework upon which the drawers run. These partitions may constitute said rails or may be actual partitions that will divide the cabinet into separate compartments.

A compartment 16 is formed below the lower drawer compartment 13 for a purpose to be presently described.

Located in the upper compartment 11 is a drawer 17 of any suitable construction sliding in and out of the cabinet on the usual rails above the division space 14. This drawer forms a supporting framework for a subframe 24 which carries the feeder mechanism for feeding copy, the light sources for photographing and printing, a platen hereinafter termed the photographing platen, a second platen hereinafter termed the printer platen, means for illuminating both said platens and a light tunnel forming a passage for light from said photographing platen to the camera.

The feeder mechanism may be of any suitable construction and may comprise a delivery table or slide 18 upon which the forward end of the copy is placed. This slide is the full width of the drawer 17 and the forward edge of same is positioned so that copy placed thereon will be fed between the upper and lower series of belts 19, 20 which move the copy forward and out to the photographing platen which may consist of a metal frame 21 having an opening 22 therein in which is inserted a piece of transparent material such as glass, or of plastic, such as Lucite or the like, as best seen at 23 in Figure 2.

However, it will be understood that the word "photographing platen" is used in this specification to describe a member defining an area in the focal plane of a camera lens across which copy is moved.

Obviously such an area is defined by the opening 22 in the frame 21 whether glass 23 is used or not.

The subframe 24 within the drawer 17 also carries the rollers over which the belts 19, 20 pass, together with the lamps 25, 26 for illuminating copy flowed past the opening 22.

A lamp 27 is positioned above the copy in line with the opening 22 and is adjustable toward and away from the copy in the manner described in the co-pending application before mentioned.

The belts are driven in any suitable manner such as by connecting pulley 28 to a suitable electrical motor supported on the subframe as indicated at 29. As the belt 19 is in frictional contact with the belt 20 all the belts are driven in the direction indicated by the arrows.

The light tunnel 30 is provided below the opening 22 in the photographing platen and the upper ends of this tunnel are adjustable towards and away from each other by any suitable means such as the Bowden wires 31 for the purpose of varying the amount of light reflected from the copy in the opening 22 through the tunnel to the lens.

A drawer 32 is positioned immediately below the drawer 17 and is so mounted as to slide in and out of the cabinet 10 in the usual manner. This drawer contains a suitable camera mechanism which is described in detail in the co-pending application before mentioned.

It will be understood that this camera has the usual delivery and take-up reels 33, 34, a feed roller 35, a drum 36 and guide rollers 37, 38 and 39. The feed roller 35 is driven by a synchronous motor (not shown) to translate film from reel 33 to reel 34. The drum 36 supports a film 40 opposite a slit 41. The film is moved linearly at a speed proportionate to the speed of the copy passing over the platen opening 22 and synchronized therewith.

A lens 42 is positioned in front of the slit 41, its optical axis being perpendicular to the surface of the photographing platen 21 and displaced to one side of a vertical median line passing through the opening 22 therein.

The middle section 43 of the light tunnel extends from immediately below the aperture 44 in the bottom of drawer 17 and the division 14, so as to form an extension of the upper section 30 thereof.

At the lower end of the tunnel section 43 is a mirror 45 placed to reflect light passing down the tunnel to a second mirror 46 which reflects the light beam through an opening 47 and into the lens 42.

The mirrors 45, 46 are mounted in a vertical adjustable frame 48, which, by any suitable means such as the rack and pinion 49 connected to a rotatable flexible shaft 50, and handle 51, can move the mirrors to vary the optical length between the flowing copy and the stationary lens as described in detail in the co-pending application number 593,891, filed May 15, 1945, entitled Optical system for microfilm apparatus, now Patent No. 2,439,055, of April 6, 1948.

The drawer 32 may also contain the upper half 52 of a delivery chute which communicates with the lower half 53 of said chute positioned in a lower drawer 54.

This lower drawer 54 as described in the first co-pending application hereinbefore mentioned, may contain a roller 55 for feeding the copy downwardly and outwardly and also contains the hinged copy holder 56 which may be swung outwardly by lowering the front panel 57 of the cabinet, which front panel can be folded down in the space 16 as described in the first co-pending application herein mentioned.

The apparatus just described will photograph copy such as a tracing for example, fed across the space 22 and would produce a continuous microfilm of said copy. The tracing is fed face downward over the photographing platen 21 so that the face of the tracing is illuminated by the lamps 25, 26 and an image of the face of the tracing is flowed on to the film 40 all as described more in detail in the first co-pending application hereinbefore mentioned.

If now the tracing which is indicated by the numeral 58, Figure 2, is fed into the machine face down, accompanied by a sensitized sheet face down, such as a sheet of blue print paper 59, it will be obvious that the blue print and the tracing will flow past the opening 22 and if the illumination from lamps 25, 26 is sufficiently strong, and the two sheets are moved at the proper speed, it is obvious that a blue print will be made of the tracing simultaneously with the projection therefrom of the image to the film 40 in the camera so that the microfilm and the contact print are made simultaneously.

Referring to Figure 2, an arcuate transparent printer platen 60 is mounted by any suitable means such as the brackets 61 between the side plates of the subframe 24 which are secured to the side walls of the drawer 17. This platen 60 forms a continuation of the platen 22 and its upper surface may be level with that of the glass platen 23, if the latter is used, so that the photographing platen and the printer platen form one continuous supporting surface for copy 58 and sheet 59.

If now the sheets 58 and 59 are fed into the device together, they will be carried across the opening 22 and a photograph of the lower surface of 58 will be made on the film 40. The sheets will then progress together to the platen 60 where they are immediately subjected to light from a plurality of lamps 62 which may be of the tubular variety, which are suitably supported in sockets some of which are shown at 63 secured to the subframe 24.

These lamps are connected in any suitable manner and may be provided with a switch (not shown) whereby they can be turned on and off at will.

The two sheets 58, 59 are held downwardly on the printing platen 60 by belts 19 and when they reach the lower end of the platen, are discharged through the opening 64 into the top of the upper chute 52. They then pass downwardly through the chute 53 and are finally discharged through the open mouth of the chute, the panel 57 being opened or removed to permit the extension of the copy holder 56 to receive the sheets which may tend to roll up in 56 so that they are easily removed therefrom.

It will be seen from the foregoing that the method herein described may be practised in two ways; first, by making the microfilm and the contact print while the sheets 58, 59 are in a first position on the photographing platen at the opening 22, or by first making the photograph when the sheets are on the photographing platen and then making the contact print while the sheets are passing over the printer platen 60. In either case, the method is carried out in the camera without any change or re-arrangement of its parts.

The first set of feed rollers 65 which engage the sheets at the forward edge of the platen 60 may be positioned in slots spaced transversely of the platen or may be arranged in any other manner in order to co-operate with the upper rollers 66 to grasp the edge of the sheets or sheet which extend to the left across the opening 22. It will be apparent that as soon as the edges of the sheets are grasped by these rollers that the belt 19 will carry the sheets downwardly over the platen 60 in a manner that will be obvious from the drawings.

Many details of the construction and operation of the apparatus herein disclosed have been omitted for the sake of brevity such, for example, as the description of the reflectors that may be placed about the lamps 25, 26, 27 and 62 for the purpose of directing the light therefrom against the sheets.

Obviously, when the platen 60 is to be used, the sensitized sheet 59 could be introduced into the apparatus to overlie the back of the sheet 58 just before the platen 60 is reached. That is to say, it could be introduced at the point 67, Figure 4. This would call for a slight modification in the arrangement and location of the pulleys for belt 19, as shown in Figure 4 where pulley 69ª replaces 69, Figure 2, and pulley 70 is driven from the same motor that drives pulley 28; or 70 may have a separate motor and drives the belt 19ª. Belts 19 and 19ª of Figure 4 therefore, operate the same as the single belt 19 of Figure 2.

A second delivery table or feeder slide 71 is mounted so as to direct the lower end of the sheet 59 to the rollers 65, 66 and the belt 19 and, with the exception of the introduction of sheet 59 at the point 67 instead of feeding this sheet over table 18 and across the platen 21, the operation of the device Figure 4 is the same as the device Figure 2.

Referring to Figure 1 which is a front view of the cabinet with the drawers and panels closed, it will be observed that the front panel 72 of the upper drawer may be hinged on the bottom or either of the side edges thereof, or may be bodily removable from the cabinet, it being held therein in any suitable manner to permit extension of the hinged front portion of the delivery table 18 which may then receive the rolls of copy to be fed into the camera.

It will also be noted that the drawer 32 may have one or more panels 32a, 32b, 32c, and these panels, like 72, may be hinged on the bottom or side edges or may be bodily removable from the cabinet.

A preferred construction is that wherein the center panel 32b forms the front of the drawer and is cut away or provided with a recess to receive handle 51 of the mechanism for adjusting the mirrors 45, 46.

The panel 57 which closes the front of the lower compartment 13 may be hinged at either side or at the bottom or may be bodily removable from the cabinet. A preferred arrangement is to hinge this panel at the bottom so that the drawer 54 can be removed, the panel folded down into the space 16, and the drawer replaced.

By this arrangement of the mechanical elements just described, a large variety of work can be easily handled. For example, tracings that are on relatively thick or thin paper, which would be different in opaqueness, can be handled by using lights 25, 26. Some tracings are made on paper with pencil lines, others are on cloth with ink lines, and still others are made on paper which is soiled with oil or the like.

Obviously, some of the tracings, when sufficiently transparent and clean, with well defined lines thereon, can have contact prints made of them while on the photographing platen, using the lights 25, 26, whereas, with other tracings, where, for any reason a much stronger light of greater time of exposure is required, the contact prints are made on the printer platen 60.

While the apparatus herein disclosed is particularly well adapted to practise the method herein disclosed, it may be understood that any other apparatus may be used that will permit either of the simultaneous or sequential production of microfilm and contact prints as disclosed herein.

What is claimed is:

1. A device of the character described, comprising a supporting framework, a motor, feeder mechanism mounted in said framework and driven by said motor including a platen adapted to support copy fed by said mechanism, a light source adapted to illuminate copy on said platen, a camera in said framework having a fixed lens focussed on said platen, means for feeding film past said lens in timed relation to the movement of said feeder mechanism whereby images of copy on the platen may be impressed on said film, a second platen adapted to receive copy fed by said feeder mechanism from said first platen, a light source adapted to illuminate copy supported on said second platen, and means operated by said motor overlying said second platen and adapted to hold a sensitized sheet in contact with the back of copy supported on said last platen whereby a contact print may be made of said copy by light from said last mentioned source passing through said copy.

2. A device of the character described, comprising a supporting framework, a motor, feeder mechanism mounted in said framework including a platen adapted to support copy fed by said mechanism, a light source adapted to illuminate copy on said platen and a camera in said framework having a lens fixed relative to said framework and focussed on said platen, means for feeding film past said lens in timed relation to the movement of said feeder mechanism whereby images of copy on the platen may be impressed on said film, a second platen adapted to receive copy fed by said feeder mechanism from said first platen, a feeder slide adapted to guide a sensitized sheet to position same to engage said mechanism and position said sheet on said second platen, a light source adapted to illuminate copy supported on said second platen, and means operated by said motor overlying said second platen and adapted to hold said sensitized sheet in contact with the back of copy supported on said last platen whereby a contact print may be made of said copy by light from said last mentioned source passing through said copy.

3. A device of the character described comprising a framework, a camera fixed to said framework and including a lens and a movable film, a feeding mechanism supported on said framework including a delivery table to receive a copy sheet to be fed past the lens of the camera in timed relation to the movement of film therein, a second delivery table adapted to position a sensitized sheet to overlie the rear side of said copy sheet, a transparent platen adapted to receive both said sheets, means for projecting light through said platen and copy sheet to imprint an image of the copy on said sensitized sheet, a motor and means driven by said motor for conveying said copy and sheet across said platen.

VERNEUR E. PRATT.
GEORGE F. GRAY.

REFERENCES CITED

The following references are of record in the file of this patent:

UNITED STATES PATENTS

| Number | Name | Date |
|---|---|---|
| 369,165 | Connon | Aug. 30, 1887 |
| 1,751,774 | Trullinger | Mar. 25, 1930 |
| 1,782,860 | Reipent | Nov. 25, 1930 |
| 1,808,386 | Caps | June 9, 1931 |
| 1,849,368 | Frazee | Mar. 15, 1932 |
| 1,849,939 | Lipschitz | Mar. 15, 1932 |
| 1,966,261 | Petit | July 10, 1934 |
| 2,206,396 | Glass | July 2, 1940 |
| 2,307,646 | Sonne | Jan. 5, 1943 |
| 2,319,882 | Reagan | May 25, 1943 |
| 2,320,350 | Del Riccio | June 1, 1943 |
| 2,371,925 | Schade | Mar. 20, 1945 |
| 2,421,150 | Jacobson | May 27, 1947 |